United States Patent [19]
Wakefield et al.

[11] Patent Number: 5,904,884
[45] Date of Patent: May 18, 1999

[54] METHOD OF FORMING AUTOMOTIVE TRIM STRIP FROM EXTRUDED THERMOPLASTIC MATERIALS

[75] Inventors: Earlby Wakefield, Guelph; Avi Zohar, Thornhill; Uwe Kelbert, Stroud, all of Canada

[73] Assignee: Decoma International Inc., Concord, Canada

[21] Appl. No.: 08/883,425

[22] Filed: Jun. 26, 1997

[51] Int. Cl.[6] .............................. B29C 47/08; B29C 47/92
[52] U.S. Cl. ................. 264/40.7; 264/210.1; 264/210.2; 425/363; 425/377; 425/461; 425/DIG. 108
[58] Field of Search .............................. 428/31; 293/128; 264/210.1, 210.2, 151, 40.7, 176.1, 177.1, 177.17; 425/DIG. 108, 325, 327, 373, 363, 461, 377

[56] References Cited

U.S. PATENT DOCUMENTS

| | | | |
|---|---|---|---|
| 5,149,481 | 9/1992 | Gross et al. | 264/210.2 |
| 5,171,499 | 12/1992 | Cehelnik et al. | 264/151 |
| 5,226,998 | 7/1993 | Few | 156/244.11 |
| 5,227,108 | 7/1993 | Reid, Jr. et al. | 264/148 |
| 5,288,529 | 2/1994 | Harvey et al. | 428/1 |
| 5,395,575 | 3/1995 | Stribbell et al. | 264/151 |
| 5,409,563 | 4/1995 | Malm | 264/146 |
| 5,478,516 | 12/1995 | Malm et al. | 264/146 |
| 5,705,236 | 1/1998 | Eraybar et al. | 428/31 |
| 5,772,827 | 6/1998 | Malm | 156/244.1 |

*Primary Examiner*—Jill L. Heitbrink
*Assistant Examiner*—Mark Eashoo
*Attorney, Agent, or Firm*—Jane Parsons

[57] ABSTRACT

A process for forming a specific length of extruded thermoplastics material trim strip for automobiles includes the step of extruding the strip directly onto an endless carrier belt moving at a speed matching the emergence speed of the extrudate. The extrudate, therefore, is less subject to stresses causing unpredictable length changes on cooling. It is therefore possible to predetermine the cooled, matured, final lengths of strip and to provide moulded end portions on-line.

8 Claims, 5 Drawing Sheets

METHOD OF FORMING AUTOMOTIVE TRIM STRIP FROM EXTRUDED THERMOPLASTIC MATERIALS

BACKGROUND OF THE INVENTION

1. Field of the Invention

This invention relates to a method of manufacture for extruded trim strip used for the sides of automobiles and for other purposes.

2. Acknowledgement of Prior Art

Trim strip on the side of motor vehicles has been traditionally added both for decorative purposes and to act as protection for the body work. The strips may be used for body side mouldings for front and rear quarter panels and side doors. They must meet exceptionally high standards for colour uniformity and match. Moreover, they must have distinctive end shapes to meet manufacturing requirements for customer appreciation.

Such strips have been made by either of injection moulding and extrusion. Both these processes have certain disadvantages. Injection moulding is slow and expensive. It is, however, possible to provide injection moulded strip having shaped moulded ends in a length accurately calculable to that length which is required.

An extruded moulding is much less expensive to produce and may be extruded onto a carrier strip or may be extruded without any carrier strip. When a carrier strip is used it is frequently a strip of aluminum.

Extruded trim strip may be cut to length or may be moulded by various means to produce decorative ends. If the strip is cut to length it will have a cut end exposed throughout the cross section of the moulding. This presents an unattractive, unfinished appearance.

An appreciable amount of effort has been made in the industry to provide extruded trim strip having finished moulded end portions. Methods and apparatus for providing such end portions are described for example in:

U.S. Pat. No. 5,171,499 (Dec. 15, 1992) Cehelnik et al.
U.S. Pat. No. 5,226,998 (Jul. 13, 1993) Few
U.S. Pat. No. 5,227,108 (Jul. 13, 1993) Reid, Jr. et al.
U.S. Pat. No. 5,395,575 (Mar. 7, 1995) Stribbell et al.
U.S. Pat. No. 5,409,653 (Apr. 25, 1995) Malm
U.S. Pat. No. 5,478,516 (Dec. 26, 1995) Malm et al.

The referenced patents are exemplary of the many patents relating to the forming of end portions in extruded trim strip.

While considerable effort and thought has been given to the forming of end portions, a major problem remains. Extruded strip which is not extruded over an integral carrier strip, cannot be produced in lengths which are sufficiently precise for use as automobile trim strip. The reason for this is in the extrusion process itself. When a length of strip is injection moulded, it will shrink on cooling but the shrinkage may be accurately predicted. When extruded strip is formed there is an additional factor in that stresses are exerted in the extruding plastic. As the plastic leaves the die there will be a force from behind pushing it through the die. As the extruded, still softened, plastic moves forward a stretching or pulling force will be exerted on it through its own weight and/or due to the carrier motion of moulding wheels or drums around which it passes to provide pinched or moulded end portions as well as by the take away conveyor which is pulling along through various equipment. This effect will continue until such time that the extrudate has cooled sufficiently to become a solid. The effect on the final length of trim is unpredictable due to the number of variables involved, for example, the type of plastic material, the extrusion temperature, the differing lengths which are required, the adjustment of the speed of the moulding wheels, etc. This problem is so extreme that it may be advantageous to mould or pinch only one end of the trim and provide a partially shaped other end which may be cut, after cooling and/or annealing for final adjustment of the length once the part has stabilized in length.

It is at least partially due to the difficulty in providing accurate lengths of extruded trim strip that integral carrier strips are used but such integral carrier strips also have disadvantages. One obvious disadvantage is that the cost of the trim strip is increased. Another disadvantage is that the carrier strip adds stiffness to the eventual composite strip and there may be a tendency for it to curl outwardly at the ends.

The present inventors have addressed the problems in the art and have attempted to provide an extruded trim strip which does not require an integral carrier strip and which is producible in accurately calculable lengths having moulded ends.

SUMMARY OF THE INVENTION

The invention provides a method for forming extruded trim strip, apparatus for forming extruded trim strip and the extruded trim strip itself.

According to the invention there is provided a process for providing predetermined lengths of extruded plastics material, the trim strip having moulded end portions comprising: extruding plastics material to emerge from an extrusion nozzle of an extrusion die, at an emergence speed onto an endless carrier belt travelling at a belt speed matched to the emergence speed, the extrusion nozzle being shaped to provide trim strip of a defined cross section; continually passing the endless carrier belt carrying extruded plastic material past moulding means to form moulded opposing end portion, of trim strip, the end portion being spaced apart one from the other by a distance to provide said prechosen length on cooling of the plastics material, cooling the carrier belt carrying extruded plastics material strips having moulded end portions and separating, cooled plastics material strips.

Preferably the endless belt is stainless steel. It may pass through the extrusion die to emerge from the extrusion nozzle with extruding plastics material. The belt speed may be matched to the emergence speed by computer control.

The emergence speed may be sensed at the extrusion nozzle by sensors, signals corresponding to the emergence speed are then passed to a computer, control signals generated by the computer are passed to a controller for the speed of a drive for the endless belt.

BRIEF DESCRIPTION OF THE DRAWINGS

An embodiment of the invention will now be described by way of example with reference to the drawings, in which.

DETAILED DESCRIPTION OF PREFERRED EMBODIMENTS

Figure 1A:
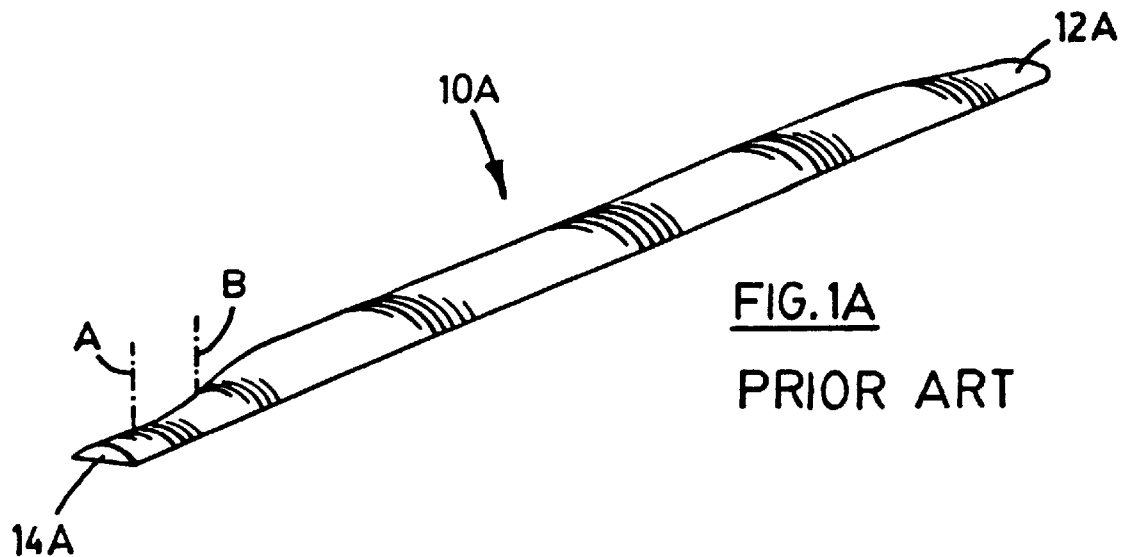
FIGS. 1A, 1B and 1C show prior art trim strip being respectively extruded trim strip having one moulded end and one partially moulded end which can be cut to adjust the length, extruded trim strip having an integral carrier, and an injection moulded trim strip.

FIG. 1A shows trim strip 10A having a formed end 12A and partially formed end 14A. Formed end 12A may be formed, for example, between forming rollers such as those described in U.S. Pat. No. 5,395,575 previously referred to. No integral carrier strip is used. End 12A of the strip 10A may be formed as a curve or a point or various other decorative ending but end 14A is conveniently formed as a narrowed part of finite length which may be cut at various points for example at A or at B or at points therebetween to adjust the length of the trim. Due to the elongate shape of the narrowed portion any minor variations in its length is not noticeable to the observer. As prior art trim strip 10A leaves the forming rollers, it may be cut into approximate lengths for use but, due to the stresses on it, it is normally stored for at least 70 hours to allow unpredictable changes in length due to plastic memory and rebound to take place. Only thereafter may the adjusting cut be made to provide the final accurate length. The need for an adjusting end cut forces a certain form on the partially formed end, for example the elongate narrowed portion shown.

Figure 1B:
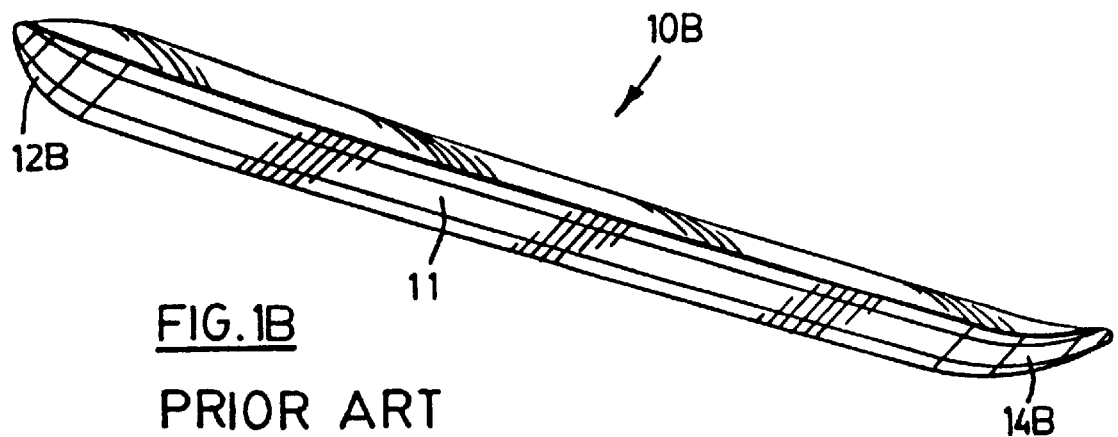

FIG. 1B shows an extruded strip 10B on an integral backing strip 11. In this case both ends 12B, 14B of the strip 10B may be formed by the forming wheel since the backing strip 11 maintains the length of the strip, from deforming as the extruded plastic matures. However, FIG. 1B shows a distinct curl at the ends of the trim strip which tends to lift the strip from the surface of the vehicle body. Moreover, trim strip of this type having an integral backing strip may be less easy to attach firmly to the vehicle and may be subject to detachment by materials inserted between the vehicle body and the strip. This may occur, for example, due to fibres in the brushes of car washes.

Figure 1C:
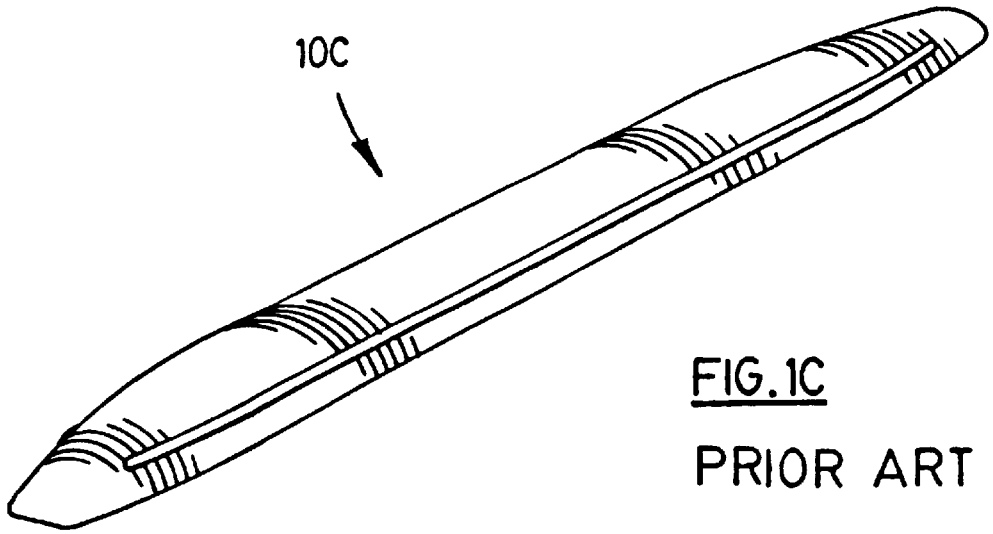

FIG. 1C shows a trim strip 10C which is injection moulded. This strip may have a high quality polished shiny surface due to the injection moulding system, moreover, it may be thick and decoratively moulded in various manners. It is not subject to unpredictable length changes on maturing, although it is subject to a calculable amount of shrinkage on cooling. It is a strip of this type which the present inventors have attempted to produce continuously and much less expensively than strip 10C. The cost of a strip such as strip 10C formed by injection moulding may be sufficiently high that it would be more economic to repair damage to a vehicle body than to apply the strip as protection against such damage.

Figure 2:
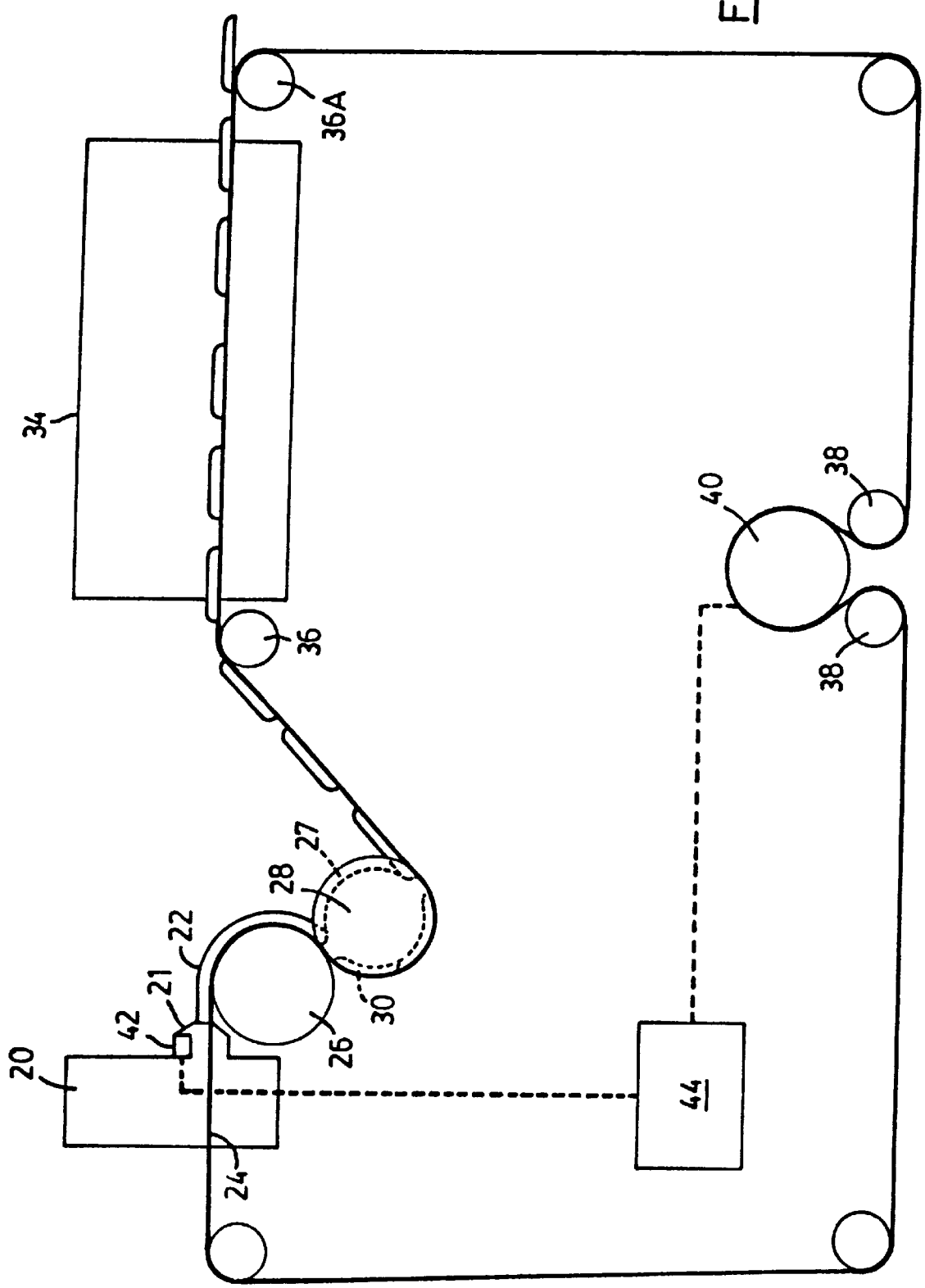
FIG. 2 is a schematic view of apparatus according to the invention.

FIG. 2 illustrates a method of forming an extruded trim strip according to the invention which is formed on a carrier conveyor which moves consistently at a speed to minimize stresses on the softened plastic material.

As shown in FIG. 2, plastics material, for example polyvinylchloride, is extruded from an extrusion die 20. Extrusion die 20 may have a profile designed for an chosen profile of trim strip. Extrudate 22 emerges from extrusion nozzle 21 of die 20 under pressure from within the die. The extrusion nozzle 21 may have a shape to produce trim strip having a desired profile. An endless carrier conveyor belt 24 suitably made of stainless steel passes through the extrusion die 20 to emerge with the extrudate 22 and to pass, together with the extrudate 22 between a supporting idler wheel 26 and a moulding periphery 27 of a forming wheel 28. The forming wheel 28 may have an actual mould cavity 46 in its periphery (see FIG. 3). In this case the shape of extrusion nozzle 21 may not be of major importance since it is possible to mould the whole trim strip in the cavity 46. Alternatively forming wheel 28 may have projections 48 to pinch form endless portions against the supporting idler wheel 26 without bearing on the intermediate portion of the trim strip (see FIG. 4). As the extrudate 22 and conveyor belt 24 emerge from the extrusion die 20, the extrudate 22 lies above and is carried on the conveyor belt 24. The conveyor belt 24 passes around the periphery of idler wheel 26 carrying the extrudate 22 radially outwards of it so that extrudate 22 is sandwiched between the conveyor belt 24 lying against the periphery of idler wheel 26 and moulding periphery 27 or forming wheel 28. The operation of the idler wheel 26 and the forming wheel 28 may be better seen from the illustration of FIG. 3.

Figure 3:
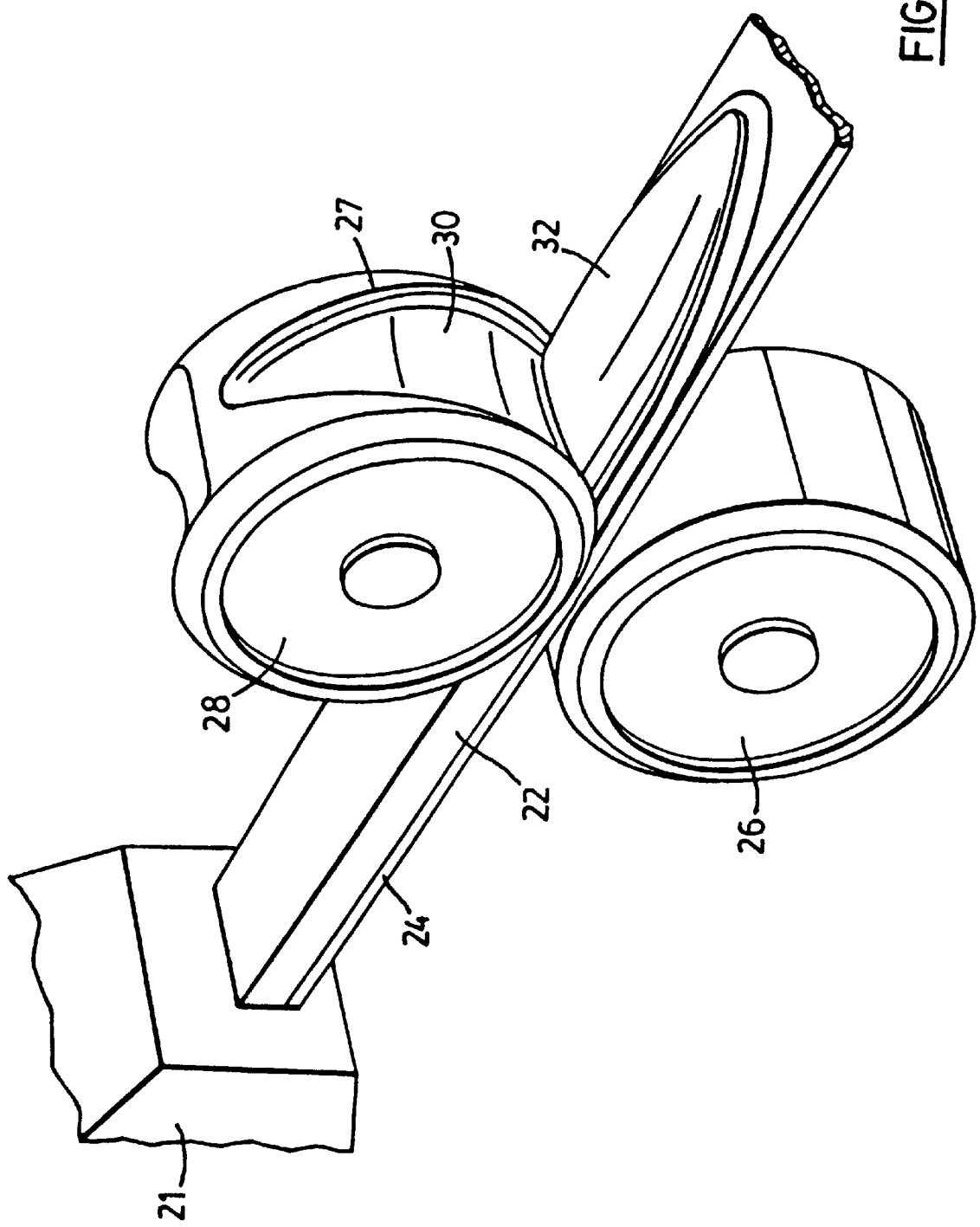
FIG. 3 shows extrudate being moulded according to the invention while carried on an endless conveyor.
Figure 4:
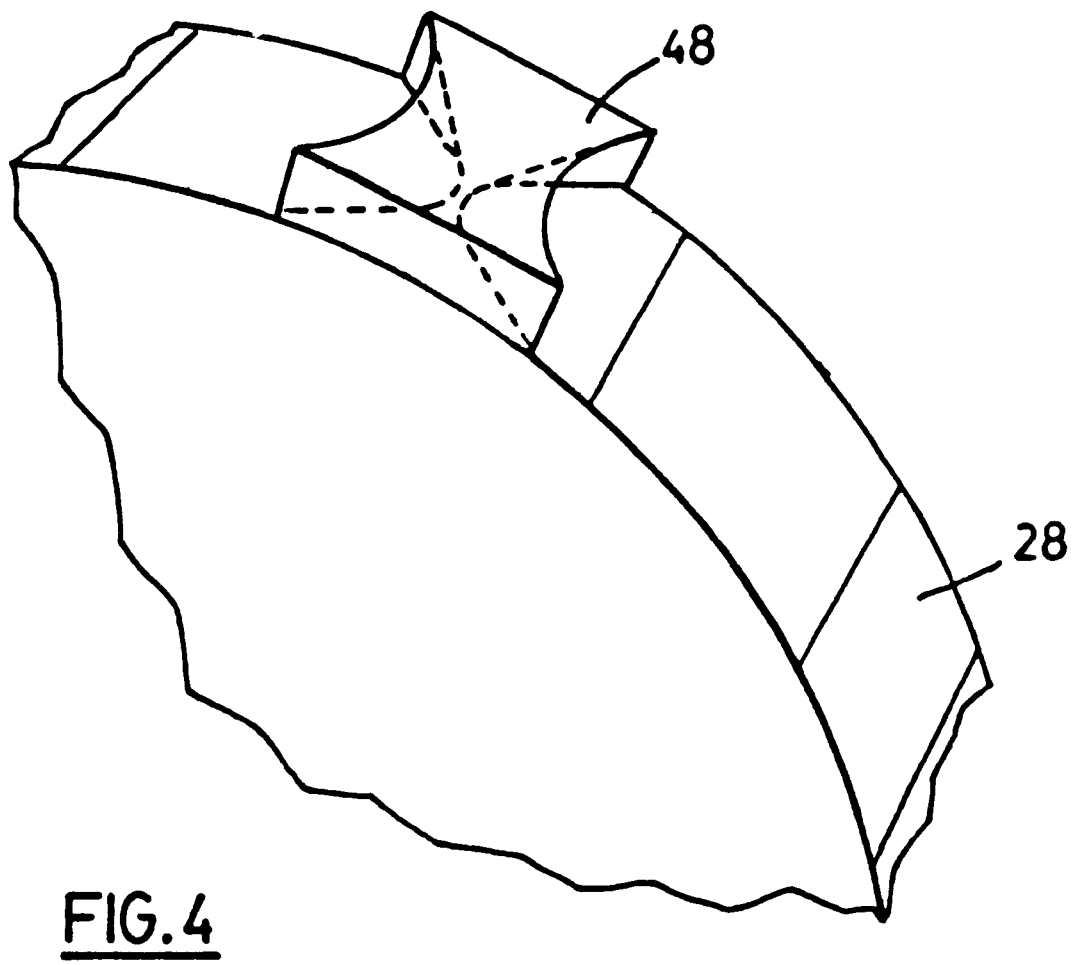
FIG. 4 shows an alternative forming wheel to that of FIG. 3.

As shown in FIG. 3, forming wheel 28 has a profiled channel 30 around its perimeter. The channel 30 is formed to provide a trim strip 32 of the desired profile. The channel 30 has a length greater than the eventual length of cooled trim strip 32 by an amount calculated to allow for shrinkage. This amount is relatively easy to calculate using the coefficient of expansion of the molten plastic material. The endless conveyor belt 24 is driven to travel at the speed at which extrudate is forced out of the extrusion die 20 and continues through out its endless length at the same speed thereby minimizing or eliminating downstream stresses on the softened extrudate 22 as it is processed by downstream equipment such as forming wheel 28.

Endless conveyor belt 24 carrying trim strips 32 which are still soft emerge from the channel of forming wheel 28 and pass through a cooling tank 34. Various rollers 36 define the path of endless conveyor belt 24.

As the conveyor belt 24 still carrying trim strips 32 emerges from cooling tank 34, the path of the conveyor belt 24 angles sharply downwardly over roller 36A tending to peel off cooled trim strips 32. The time taken from emergence of extrudate 22 from extrusion die 20 to peeling off of trim strip 32 at roller 36A may be, say, under 5 minutes. Time is still necessary for trim strips 32 to mature finally but, due to the fact that they have never been under subjected to stretching and pulling forces due to the moulding wheel and take away conveyor, that conveyor belt 24 has carried them at the exit speed from the extrusion die, no further unpredictable changes in length should occur.

Endless conveyor belt 24 continues over further rollers 36 through tension wheels 38 and drive wheel 40 to return to the extrusion die 20 to travel through it to receive more extrudate 22. Drive wheel 40 may be driven by any convenient drive means and may be controlled in response to the exit speed of extrudate from the extrusion die. Speed sensors 42 may be provided at the nozzle of the extrusion die 20. Signals from the speed sensors may be fed to computer 44 which provides control signals to control drive roller 40.

Figure 5:
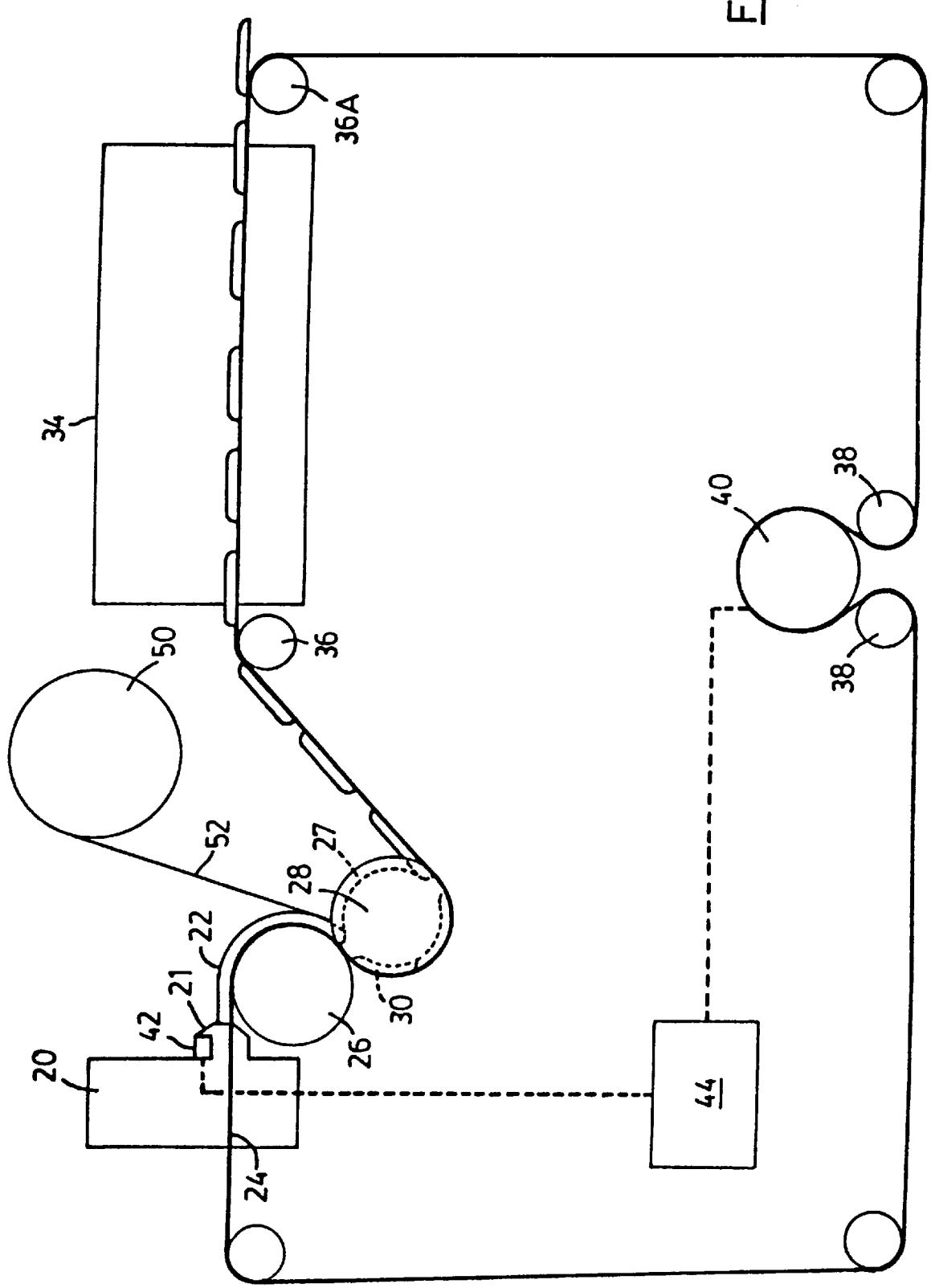
FIG. 5 is a schematic view of apparatus according to the invention including means to apply an outer decorative skin to the strip.

If it is desired to apply top coating of glossy plastics material this may be carried out by means of the process and apparatus schematically shown in FIG. 5 which shows a roll 50 of tape 52 to be applied as a top coat. The step of applying a top coating may be generally as described in U.S. Pat. No. 5,395,575.

We claim:

1. A process for providing prechosen lengths of extruded plastics material trim strip having moulded end portions comprising:

extruding plastics material to emerge from an extrusion nozzle of an extrusion die, at an emergence speed onto an endless carrier belt traveling through the extrusion die at a belt speed matched to the emergence speed so that the belt emerges from the extrusion nozzle with extruding plastics material, the extrusion nozzle being shaped to provide trim strip of a prechosen cross section;

continually passing the endless carrier belt carrying extruded plastics material past moulding means to form moulded opposing end portions, of trim strip, the end portions being spaced apart from one another by a distance to provide said chosen length on cooling of the plastics material;

cooling the carrier belt carrying extruded plastics material strips having moulded end portions and separating, cooled plastics material strips.

2. A process as claimed in claim 1 in which the endless belt is stainless steel.

3. A process as claimed in claim 1 in which the belt speed may be matched to the emergence speed by computer control.

4. A process as claimed in claim 1 in which emergence speed is sensed at the extrusion nozzle by sensors, signals corresponding to the emergence speed are passed to a computer, control signals generated by the computer and passed to a controller for the speed of a drive for the endless belt.

5. A process as claimed in claim 1 in which the endless belt carrying extruded plastics material passes between a moulding periphery of a moulding wheel and a support with the extruded plastics material adjacent the moulding periphery.

6. A process as claimed in claim 5 in which the support is an idler wheel.

7. A process as claimed in claim 5 in which the moulding periphery has a mould cavity therein.

8. A process as claimed in claim 5 in which the moulding periphery has projecting moulds for the end portions.

* * * * *